United States Patent
Marinka-Tóth et al.

(10) Patent No.: US 7,557,541 B2
(45) Date of Patent: Jul. 7, 2009

(54) METHOD AND APPARATUS FOR CHARGING A RECHARGEABLE BATTERY WITH NON-LIQUID ELECTROLYTE

(76) Inventors: József Marinka-Tóth, 508. utca 23., H-1773 Budapest (HU); Attila Reisz, Erdōalja u. 12., H-2080 Pilisjászfalu (HU); Viktor Rozsnyay, Kōérberki 1037 HRSZ, H-1112 Budapest (HU)

( * ) Notice: Subject to any disclaimer, the term of this patent is extended or adjusted under 35 U.S.C. 154(b) by 0 days.

(21) Appl. No.: 10/478,815

(22) PCT Filed: May 28, 2002

(86) PCT No.: PCT/HU02/00047

§ 371 (c)(1), (2), (4) Date: Nov. 26, 2003

(87) PCT Pub. No.: WO02/097944

PCT Pub. Date: Dec. 5, 2002

(65) Prior Publication Data

US 2004/0232886 A1 Nov. 25, 2004

(30) Foreign Application Priority Data

May 28, 2001 (HU) .................................. 0102198
May 24, 2002 (HU) .................................. 0201744

(51) Int. Cl.
*H02J 7/04* (2006.01)
*H02J 7/16* (2006.01)
(52) U.S. Cl. .................... 320/139; 320/155; 320/129
(58) Field of Classification Search .............. 320/155, 320/100, 129, 139, 137–19, 134; 323/282
See application file for complete search history.

(56) References Cited

U.S. PATENT DOCUMENTS

| | | | |
|---|---|---|---|
| 4,740,739 A | 4/1988 | Quammen et al. | 320/129 |
| 4,947,124 A | 8/1990 | Hauser | 320/129 |
| 5,280,229 A | 1/1994 | Faude et al. | |
| 5,307,000 A * | 4/1994 | Podrazhansky et al. | 320/129 |
| 5,614,805 A * | 3/1997 | Momotani et al. | 320/139 |
| 5,629,600 A | 5/1997 | Hara | 320/132 |

(Continued)

FOREIGN PATENT DOCUMENTS

EP 0598470 5/1994

(Continued)

*Primary Examiner*—Akm E Ullah
*Assistant Examiner*—Samuel Berhanu
(74) *Attorney, Agent, or Firm*—Robert C. Klinger

(57) ABSTRACT

The object of the invention is a method for charging a rechargeable battery having non-liquid electrolyte, which battery has an internal resonance frequency. The charging process contains at least one charging interval performed with current pulses, the frequency of said current pulses is essentially identical with the internal resonance frequency of the battery to be charged. Following the charging interval consists of periodic current pulses optionally a second relaxation interval is inserted, in which no charging current is applied to the rechargeable battery, within which optionally a second discharging interval is applied. After the second relaxation interval the charging is performed in an interval consists of a continuous charging current, whereafter an optional first relaxation interval is inserted, within which optionally a second discharging interval is applied. This sequence of the above steps can be varied and applied repeatedly until the full charge of the battery is attained.

24 Claims, 2 Drawing Sheets

U.S. PATENT DOCUMENTS

| | | | |
|---|---|---|---|
| 5,726,554 A * | 3/1998 | Freiman et al. | 320/157 |
| 5,760,570 A * | 6/1998 | Nagai et al. | 320/162 |
| 5,783,929 A * | 7/1998 | Taricco | 320/139 |
| 5,872,443 A * | 2/1999 | Williamson | 320/160 |
| 5,891,590 A * | 4/1999 | King | 429/49 |
| 6,057,608 A | 5/2000 | Bailey, Jr. et al. | |
| 6,184,650 B1 * | 2/2001 | Gelbman | 320/100 |
| 6,307,358 B1 * | 10/2001 | Conrad | 323/282 |
| 6,525,511 B2 | 2/2003 | Kubale et al. | |
| 6,621,246 B2 | 9/2003 | Kubale et al. | |
| 6,876,173 B2 | 4/2005 | Mastaler et al. | |
| 6,924,620 B2 | 8/2005 | Santana, Jr. | |
| 6,965,214 B2 | 11/2005 | Kubale et al. | |
| 7,018,233 B1 | 3/2006 | Griffin, III et al. | |
| 2002/0125857 A1 | 9/2002 | Mastaler et al. | |

FOREIGN PATENT DOCUMENTS

| | | |
|---|---|---|
| WO | WO 9315543 | 8/1993 |

\* cited by examiner

METHOD AND APPARATUS FOR CHARGING A RECHARGEABLE BATTERY WITH NON-LIQUID ELECTROLYTE

TECHNICAL FIELD

The invention relates to a method for charging a rechargeable battery having non-liquid, but for example a gel electrolyte, said battery has an internal resonance frequency. In the course of charging a charging current is applied to a battery. The invention relates furthermore to a circuit arrangement for implementing the method of charging the battery having non-liquid electrolyte, where an electric power supply is connected through a current measuring device to the battery terminals.

BACKGROUND ART

Several methods are known for quick charging of batteries, where the charging current is periodically interrupted and during the pause on charging a short discharge or a load is applied to the battery to be charged. The aim at these methods is to reduce the duration of charging as much as possible and to increase the lifetime of the battery by the proper maintenance and formation of the storing cells.

The charge storing capacity of a battery is specified by Ah ampere-hours. From this value a C5 value is derived by dividing it by the time=ampere-hour/hour, so C5 has a current dimension. The charging current of the battery is determined in proportion of C5. For example, for a battery having 55 Ah capacity, C5=55 A. The proper charging current of the battery is given in proportion of C5, for example 0,1·C5, in this case 5,5 A. In the following description we use the term C5 in accordance with this definition.

In the U.S. Pat. No. 5,600,226 patent specification a method for controlling and terminating the charging of a battery is described. In the course of this method the voltage is periodically measured at the terminals of the battery and compared with the result of the preceding such measurement, then based on the difference of these two measurements the charged state level of the battery is being determined. With this known solution, the charging is periodically interrupted and during the pause of charging the measurements are performed after a short discharge pulse. At the beginning the charging is performed slower than the final charging rate, at about 20% of this final rate, then by increasing the charging pulse width the charging rate is increased to the definitive charging rate. This method has been developed before all to terminate the charging method at that point at which the battery has attained a full charge. A rapid charging of the battery is realized as well.

A similar rapid charging method is disclosed in the international patent application no. WO 00/76050 A1, in that solution however two successive discharge pulses are applied in every charging interval. After each of the two successive discharge pulses measurements are performed, to collect more accurate data on the state of the rechargeable battery.

The object of the invention is to provide a method and apparatus by means of which a faster charging of rechargeable batteries can be achieved, than with the known methods.

DISCLOSURE OF INVENTION

It is well known that the reduction of the charging time is limited by the slowness of the chemical transformations causing the charging current inside the battery. If in the cells of the rechargeable battery the rate of the chemical transformations can be increased, the charging time can be reduced. Accordingly, the object of the invention is to provide such a charging method, by which the molecular movements in the cells of the rechargeable battery can be accelerated and through this the time necessary for the chemical transformations and the time necessary for the full charge itself can be reduced.

It has been recognized that the intensity of pulsed charging current applied to and taking of by a rechargeable battery is a function of the frequency of the charging pulses, i.e. the impedance of the rechargeable battery varies with the frequency. Varying the charging pulse frequency, a peak charging current vs. frequency of the battery can be found. The peak current frequency varies from battery to battery and depends on their charged state. The method according to the invention and the apparatus implementing the method are based on this recognition.

The object of the invention set before has been attained by means of the method in accordance with invention in such a manner, that the charging process contains at least one charging interval performed with current pulses, the frequency of said current pulses is essentially identical with the internal resonance frequency of the rechargeable battery to be charged. The duty factor of the periodic current pulses is between 1:10 and 10:1 and the peak current of said current pulses is in the range of 1·C5 and 7·C5. The duration of the interval of periodic current pulses ranges between 200 ms and 1500 ms, where the frequency of the periodic current pulses is within the range of 100 Hz and 10 000 Hz.

The advantage of this method consists in the fact, that when charging with pulses at the resonance frequency of the rechargeable battery the multiple of the usual charging current may be applied without a significant heat dissipation and damaging the battery, meanwhile an intensive internal molecular movement can be achieved in the cells, which results in a significant acceleration of the chemical transformation and of the charging of the battery.

According to a preferred embodiment of the method according to the invention, following the charging interval consists of periodic current pulses the charging is performed in an interval consists of a continuous charging current, the duration of which is ranging between 200 ms and 1500 ms, then a charging interval with periodic current pulses is applied again. The interval consists of said continuous charging current is performed within a current intensity range of 1·C5 and 7·C5.

The advantage of this embodiment is that during the charging with current pulses the battery is substantially prepared to accept the intensive charging, then an intensive charging can be adapted with the continuous charging current.

In a further preferred embodiment of the method according to the invention between the charging interval with continuous current and the subsequent charging interval with periodic current pulses a first relaxation interval is inserted, in which no charging current is applied to the rechargeable battery. The duration of the first relaxation interval is not more than 1500 ms.

The advantage of this alternative embodiment is that during the first relaxation interval the chemical transformations will be further enhanced, then the following charging with periodic current pulses will efficiently effectuate again the molecular movements in the cells.

Within the first relaxation interval a first discharging interval is applied, the duration of which is not more than 50 ms. This discharging interval influences advantageously the charge taking of capability of the rechargeable battery.

According to a further preferred embodiment, between the charging interval consists of periodic current pulses and the subsequently applied interval consists of continuous current a second relaxation interval is inserted, in which no charging current is applied to the rechargeable battery, the duration of the second relaxation interval is not more than 1500 ms. Within the second relaxation period a second discharging interval is applied, the duration of which is not more than 50 ms.

In the apparatus implementing the method according to the invention, the battery to be charged has an internal resonance frequency and through a current metering device a power supply is connected to the terminals of the rechargeable battery. In accordance with the invention, in addition to the current metering device between one of the battery terminals and the power supply a controlled current generator is inserted, to the control input of which a control signal is applied by means of a control circuit, the intensity of the charging current applied through the current generator to the terminal of the rechargeable battery is controlled by means of said control signal.

According to a preferred embodiment of the apparatus according to the invention, the control circuit provides a square pulse having a frequency corresponding to the internal resonance frequency of the rechargeable battery, said square pulse is applied to the control input of the controlled current generator, said current generator interrupts the charging current during the square pulse spaces and during the pulses controls the charging current flowing through the current generator to a value between 1·C5 and 7·C5. The duty factor of the square pulse having a frequency corresponding to the internal resonance frequency of the battery to be charged is in the range of 1:10 and 10:1.

According to an other preferred embodiment the output of the current metering device is connected to the control unit, on basis of the feedback signal provided by the current metering device the control unit controls the intensity of the charging current by means of the current generator.

The current metering device is implemented by means of a Hall-generator or simply by means of a resistor, the output signal of which appears on the ends of the resistor.

To implement the discharge interval according to the invention parallel to the terminals of the rechargeable battery to be charged at least one discharging circuit is connected, which consists of a series arrangement of a resistor and a controlled switch. Accordingly, to the control input of said controlled switch an output of the control unit delivering a pulse corresponding to the discharging interval is connected.

The controlled switch is implemented with a known, fast operating, preferably semiconductor device, for example by means of a FET.

The charging of the rechargeable battery adapting the method according to the present invention may be continued till its fully charged state. The statement, sensing, displaying of the charged state are not objects of this invention, for this purpose several other solutions are well known.

The method according to the invention, as well as the apparatus for the implementation of the method is now explained in details below and reference is made to the exemplary embodiment, shown on the accompanying drawings.

BEST MODE FOR CARRYING OUT THE INVENTION

Figure 1:
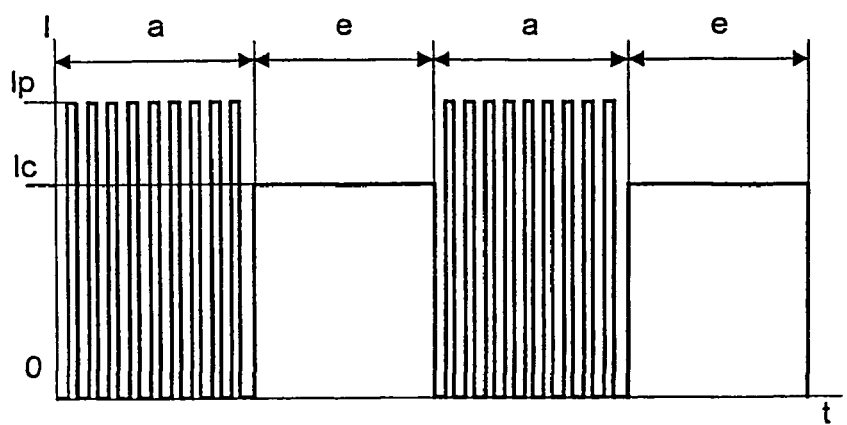
FIG. 1 is a graph depicting the charging current, as a function of time in accordance with the simplest method of the invention.

The first and simplest possible preferred method according to the invention can be followed in FIG. 1. On the horizontal axis of the graph the time t, on the vertical axis the current I applied to the terminals of the rechargeable battery are drawn up. The charging current is supplied by an electric power supply applied through a charging circuit to the terminals of the battery to be charged, which power supply can be a rectifier connected to the AC power line voltage, but any battery with higher voltage or similar may be used as well. With this embodiment there are different charging intervals inserted into the charging current, namely interval a, which is a pulsed charging interval, followed by an interval e, which is a charging interval with continuous charging current.

The interval a is a charging interval consisting of charging current pulses. The frequency of the pulse series is essentially identical with the internal resonance frequency of the rechargeable battery. This resonance frequency lies in the practice in the range of 100 and 10 000 Hz, but rechargeable batteries with higher resonance frequencies are also known. The duty factor of the pulses, that is the signal/pause ratio may be chosen in the range of 1:10 to 10:1. The duration of the interval a is preferably within the range of 200 ms and 1500 ms. Within this range the more exact duration has to be determined experimentally in compliance with the type of the rechargeable battery.

In interval a the intensity of the Ip current pulses is advantageously in the range of 1·C5 and 7·C5, the value of which has to be determined also experimentally in compliance with the type of the respective rechargeable battery.

In interval a the rechargeable battery takes up a relatively smaller charge, the pulse series of this interval substantially prepares the cells of the rechargeable battery for taking up the charge. The interval a is followed by an interval e, the duration of which is preferably between 200 ms and 1500 ms, the optimal duration of this interval has to be determined experimentally also in compliance with the type of the rechargeable battery. Within interval e the value of the charging current pulse Ic is constant and its value is advantageously in the range of 1·C5 and 7·C5.

The optimal current pulse Ip within the interval a, the charging current Ic within the interval e, as well as the duration of interval a and the duration of interval e can be considered constant. These values do not vary for rechargeable batteries of a given type.

As can be seen in FIG. 1 the section consisting of the above mentioned interval a and interval e repeats, that is after an interval e follows again an interval a, then follows an interval e. This process can be periodically repeated till the complete charging of the rechargeable battery is attained.

Figure 2:
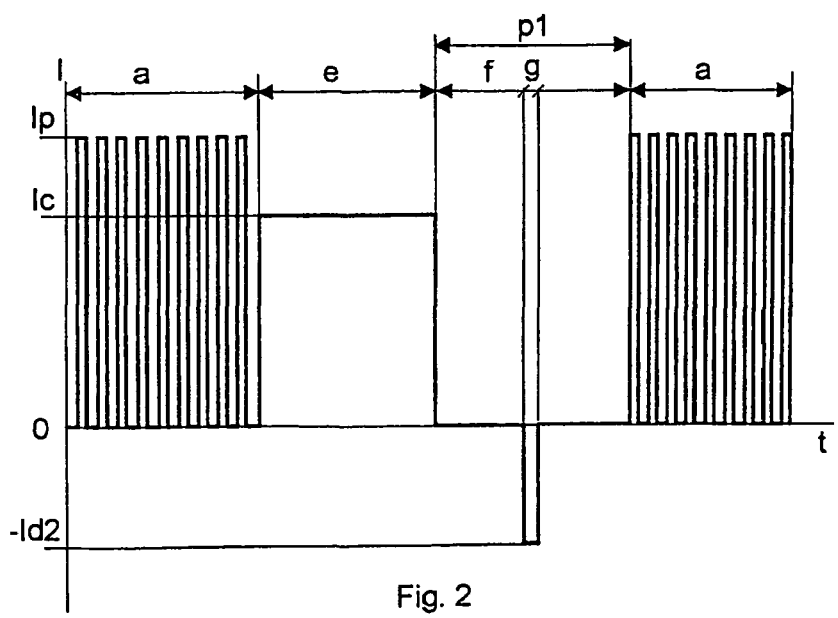
FIG. 2 is a graph depicting the charging current, as a function of time in accordance with a second preferred method of the invention.

In FIG. 2 a variation illustrated for the charging method of the rechargeable battery, where the period consisting of the interval a and interval e is followed by a relaxation interval p1, during which no charging current applied. During this relaxation interval p1 the internal chemical transformation of the rechargeable battery promotes the more effective charge uptake. The duration of the relaxation interval p1 may be substantially very short, preferably at most 1500 ms, the optimal duration of this interval has to be determined experimentally also in compliance with the type of the rechargeable battery. Following the relaxation interval p1 follows again an interval a consisting of periodic current pulse series. The sequence of intervals a, e and p1 repeats periodically. This process can be repeated till the complete charging of the rechargeable battery attained.

The charge take-up capacity of the rechargeable battery can be increased, when during the relaxation interval p1 a short discharge interval g is inserted, the duration of which is at most 50 ms. This discharge interval g is applied with at most 700 ms delay after the interval e. The discharge is performed with a limited −Id1 current, the intensity of which is at most 7·C5.

Figure 3:
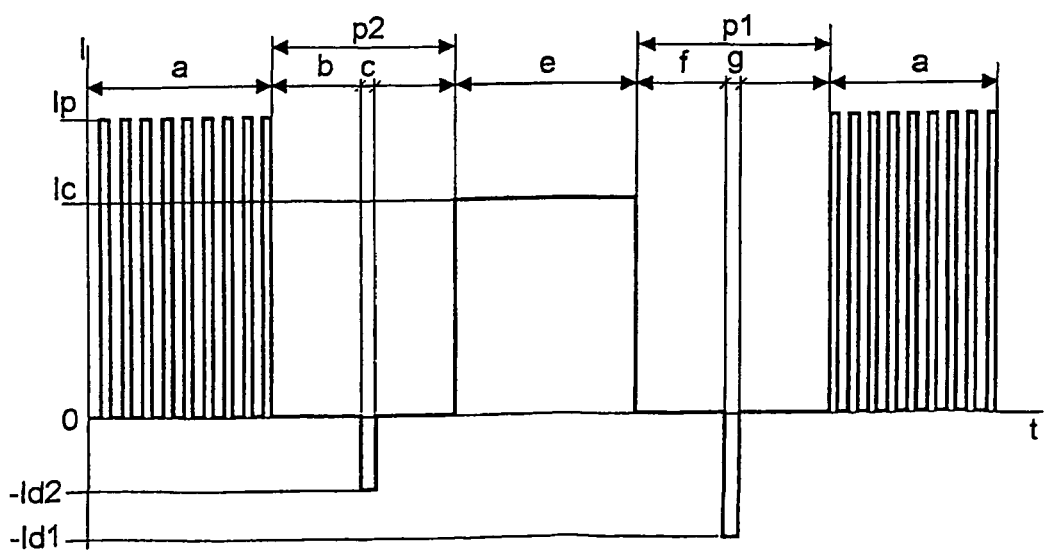
FIG. 3 is a graph depicting the charging current, as a function of time in accordance with a third preferred method of the invention.

In FIG. 3 a further preferred embodiment of the method according to the invention is shown, which differs from the method shown in FIG. 2 in that, that between the interval a consists of current pulse series and the continuous charging current interval e a second relaxation interval p2 is inserted. The duration of the relaxation interval p2 can be optionally short, as like as the said relaxation interval p1, but their duration are not necessarily the same. The maximal duration of the relaxation interval p2 is 1500 ms too. Within the second relaxation interval p2 a second discharge interval c is inserted, the duration of which is at most 50 ms. This discharge interval c is applied with at most 700 ms delay after the interval a consisting current pulse series. The discharge is performed with a limited −Id2 current, the intensity of which is at most 7·C5.

The method disclosed in connection with the before mentioned examples not necessarily has to be applied in the full charging time of the rechargeable battery. The charging time can be effectively reduced even if the continuous charging current of the rechargeable battery is interrupted by an interval a consisting of current pulse series or by the intervals a to h or p1, p2 shown in FIGS. 1 to 3 respectively.

The continuous charging can be desirable at the beginning of the charging process in such cases, if a rechargeable battery is completely or deeply discharged. With such batteries there is mostly no resonance phenomenon. In such cases the rechargeable battery is to be charged by continuous charging at least to such a charge level, where the internal resonance of the rechargeable battery can be detected and from this level the method shown in FIGS. 1 to 3 can be effectively applied. However, rechargeable batteries in continuous use, are usually not discharged to such a deep level.

Figure 4:
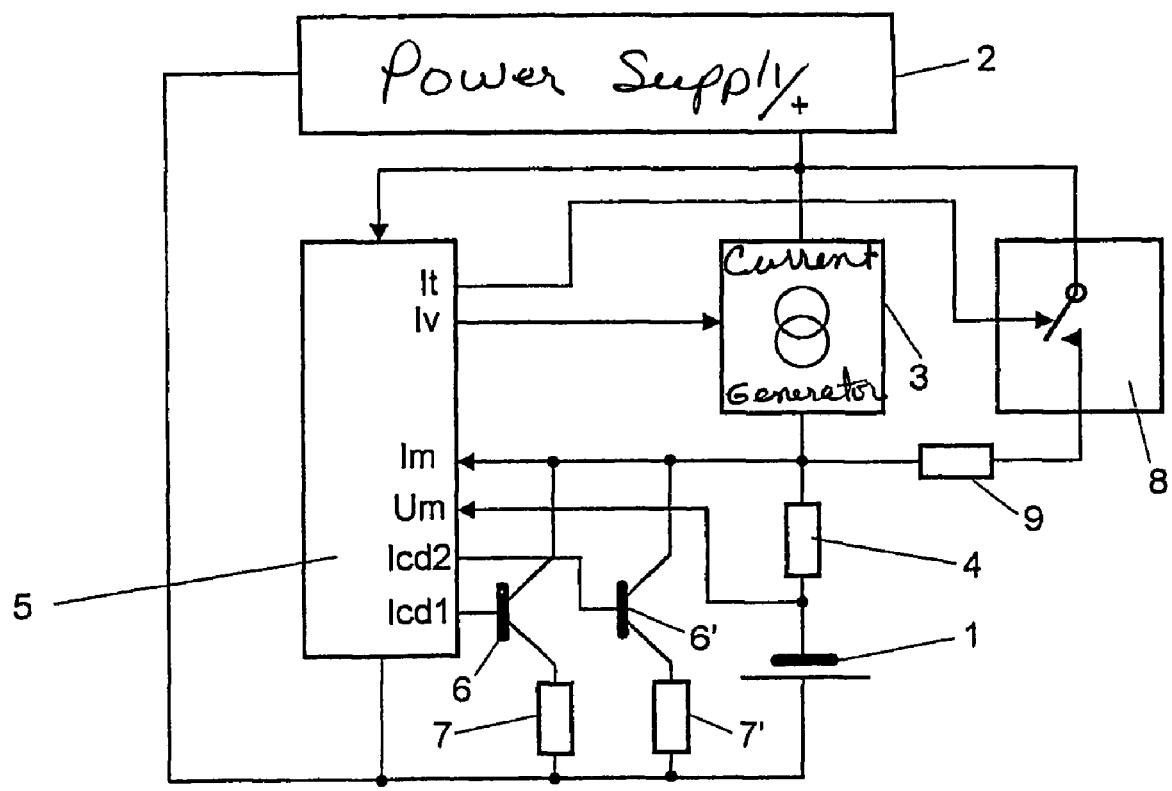
FIG. 4 is the schematic circuit diagram of an apparatus for the implementation of the method in accordance with the invention.

The circuit diagram of a battery charger apparatus according to the invention implementing the method according to the invention is shown in FIG. 4. The charging current applied to the rechargeable battery 1 is supplied by an electric power supply 2 or an other rechargeable battery with higher voltage, or similar through a controlled current generator 3. Between the current generator 3 and the rechargeable battery 1 a current metering device 4 is inserted. Parallel to the terminals of the rechargeable battery 1 a controlled loading unit is connected, which consists of the series arrangement of a resistor 7 and a controlled switch 6, the latter is preferably a semiconductor switching device, for example a FET or a transistor or any other, fast operating controlled switching element. The control input of the controlled switch 6 is connected to the output Icd1 of the control circuit 5;

The method according to FIGS. 1 to 3 is implemented by a control circuit 5, for example by means of a programmable function generator. Accordingly, the control output Iv of the control unit 5 is connected to the control input of the current generator 3. During the charging interval a consisting of periodic current pulse series the said control output Iv provides a square pulse having a frequency identical with the internal resonance frequency of the rechargeable battery 1 to be charged, the amplitude of which is proportional with the intensity of the pulse Ip. This square pulse opens the current generator 3 during the pulse and applies current pulses Ip to the rechargeable battery 1, the amplitude of which square pulses is proportional to the charging current pulses Ip applied through the current metering unit 4.

In accordance with the preferred embodiment of the invention shown in FIG. 4 the positive terminal of the rechargeable battery 1 is connected to the voltage metering input Um of the control unit 5. The output of the current metering device 4 is connected to the current metering input Im of the control circuit 5.

The current metering device 4 can be any known current meter, such as a known Hall-generator, but a simple resistor, schematically shown in FIG. 4 can be utilized too, on the ends of which a voltage appears proportional to the charging current flowing into the rechargeable battery 1, but any other known current metering element can be utilized for this purpose. The voltage on the current metering resistor shown in the example and illustrated in FIG. 4 applied to the voltage measuring input Um and the current measuring input Im of the control unit 5. By this voltage the control unit 5 controls the amplitude of the square pulse appearing on the control output Iv.

The frequency of the square pulses appearing on the control output Iv can be set on the function generator of the control unit or—if the battery charger is utilized to a given type of rechargeable battery—it is set to a determined frequency. According to the experiences the duty factor of the square pulses may vary within the range of 1:10 and 10:1, which can be determined more precisely experimentally in compliance with the type of the rechargeable battery.

The function generator of the control unit 5 provides the interval e in a similar manner, as well as the relaxation interval p1 or the relaxation interval p2, shown in FIG. 3. During the interval e appears a continuous signal at the output Iv, whereas during the relaxation intervals p1 and p2 the current generator 3 is in closed state, does not forward any charging current.

In the course of the method according to the invention, during the relaxation intervals p1 and p2 the optionally applicable discharging intervals c and g respectively are implemented by means of a serial discharge or loading circuit consisting of a resistor 7 and a controlled switch 6. For this purpose the control unit 5 supplies through its output Icd1 a pulse to the control input of the controlled switch 6 produced preferably by the function generator mentioned above, the duration of said pulses corresponds to the duration of intervals c and g, respectively. On effect of said pulse the switch 6 closes and a discharge current determined by the resistor 7 and the voltage of the battery 1 loads the rechargeable battery 1 for the duration of the pulse.

In the case when in the relaxation intervals p1 and p2 the −Id1 and −Id2 discharging currents in the intervals c and g are different, a further loading circuit will be connected parallel to the terminals of the rechargeable battery 1 consisting of a controlled switch 6' and a resistor 7'. The input of the controlled switch 6' is connected to the output Icd2 of the control unit 5. The loading circuits consisting of two different resistors 7 and 7' loading with different discharge currents −Id1 and −Id2 the rechargeable battery 1.

The control unit 5 may be completed in such a manner, that preceding the charging a test can be performed on the rechargeable battery 1. The test results can be stored and the charging can be performed on basis of the stored data. For example, in a preliminary testing period the function generator of the control unit 5 provides a square pulse having a continuously varying wobbulating frequency between 100 Hz and 10 000 Hz, the amplitude of which is significantly lower than that of the square pulse used during the charging, for example has a value of 0,1-C5. For this reason between the power supply 2 and the current metering device 4 a series arrangement of a controlled switch 8 and of a resistor 9 is included, as shown in FIG. 4. The control input of the controlled switch 8 is connected to an output It of the control unit 5.

For testing purposes a low measuring current pulse series has to be applied, with which it can be ensured, that when varying the frequency the measuring charging current applied to the rechargeable battery does not reach the saturation current even at the resonance frequency. This current can be set by means of the resistor 9.

The voltage proportional with the test charging current having a wobbulating frequency measured by the current metering device 4 appearing between the voltage metering input Um and the current metering input Im is proportional with the internal resistance of the tested rechargeable battery at the instantaneous frequency of the square pulse. This measuring charging current pulse series has a peak value in function of the pulse frequency, which is the resonance frequency of the tested rechargeable battery.

Of course the current generator 3, the switch 8 and the resistor 9 can be integrated in a single circuit as well, with which both the testing and the charging of the rechargeable battery can be performed.

The method according to the invention is intended for use in the charging of rechargeable batteries with non-liquid electrolyte, such as Li-ion, NiCd, NiMH and lead batteries with gel electrolyte (SLA).

The invention claimed is:

1. A method of charging a rechargeable battery having terminals and a non-liquid electrolyte, the battery including an internal resonance frequency, comprising:
    a current generator applying a charging current, zero voltage, to at least one of the rechargeable battery terminals, wherein the applying of charging current includes at least one charging interval, including a first charging interval applying current pulses, a frequency of the current pulses being essentially identical with the internal resonance frequency of the rechargeable battery; and
    a controller providing a signal to the current generator, the current generator applying the charging current as a function of the signal.

2. A method according to claim 1, wherein a duty factor of the current pulses is between 1:10 and 10:1.

3. A method according to claim 1, the wherein a current of the current pulses is in the range of 1·C5 and 7·C5.

4. A method according to claim 1, wherein the duration of the first charging interval of current pulses ranges between 200 ms and 1500 ms.

5. A method according to claim 1, wherein the frequency of the current pulses is within the range of 100 Hz and 10 000 Hz.

6. A method according to claim 2, wherein the first charging interval applies the current pulses within a current intensity range of 1·C5 and 7·C5.

7. The method according to claim 1 wherein following the first charging interval the applying of the charging current is performed in a second said charging interval providing a continuous charging current.

8. A method according to claim 7 further comprising a third said charging interval, wherein between the second charging interval and the third charging interval, a first relaxation interval is provided in which no charging current is applied to the rechargeable battery.

9. A method according to claim 8, wherein the duration of the first relaxation interval is not more than 1500 ms.

10. A method according to claim 8, wherein within the first relaxation interval a first discharging interval is applied to discharge the battery, wherein the duration of the first discharging interval is not more than 50 ms.

11. A method according to claim 7, wherein, between the first and second charging intervals a second relaxation interval is produced whereby no charging current is applied to the rechargeable battery.

12. A method according to claim 11, wherein the duration of the second relaxation interval is not more than 1500 ms.

13. A method according to claim 11, wherein within the second relaxation interval a second discharging interval is applied to discharge the battery.

14. The method according to claim 1, wherein the duration of the second interval ranges between 200 ms and 1500 ms, and wherein a third said charging interval with current pulses is then applied.

15. An apparatus configured to charge a rechargeable battery having terminals and a non-liquid electrolyte, wherein the rechargeable battery includes an internal resonance frequency, and is configured to be recharged by a power supply connected to the terminals of the rechargeable battery comprising:
    a current generator configured to couple to at least one of the battery terminals and is configured to provide a current pulse train, and no voltage, the current pulse train having a frequency corresponding to the internal resonance frequency of the rechargeable battery during a first charging interval; and
    a controller configured to provide a signal to the current generator, the current generator configured to provide the current pulse train as a function of the signal.

16. The apparatus according to claim 15 wherein the current generator is also configured to produce a continuous charging current during a second charging interval.

17. An apparatus according to claim 16 wherein the current generator provides a third charging interval, wherein the current generator is configured to produce a first relaxation interval after the second charging interval and before the subsequent third charging interval whereby no charging current is provided during the first relaxation interval.

18. An apparatus according to claim 17, wherein the current generator is configured to provide a second relaxation interval between the first charging interval and the second charging interval wherein no charging current is provided to the battery during the second relaxation interval.

19. An apparatus according to claim 18 further comprising the battery, and at least one battery discharging circuit coupled to the battery and including a series arrangement of a resistor and a controlled switch, further comprising the current generator delivering a pulse during a discharging interval to the controlled switch to discharge the battery.

20. The apparatus according to claim 16 wherein the magnitude of the continuous charging current is between 1·C5 and 7·C5.

21. An apparatus configured to charge a rechargeable battery having terminals and a non-liquid electrolyte, wherein the rechargeable battery includes an internal resonance frequency, and is configured to be rechargeable by a power supply connected to the terminals of the rechargeable battery comprising:

a controllable current generator, configured to provide charging current, corresponding to the internal resonant frequency of the battery to at least one of the battery terminals as a function of a control signal; and signal generator producing the control signal, the control signal comprising a pulse train of pulses having a frequency corresponding to the internal resonance frequency of the rechargeable battery during a first charging interval, the charging current being current pulses when the pulse train is provided and being no current when the pulse train is not provided.

22. An apparatus according to claim 21 wherein the signal generator produces the control signal during a second charging interval, wherein the control signal includes a first relaxation interval between the first charging interval and the second charging interval whereby no charging current is provided to the battery during the first relaxation interval.

23. An apparatus according to claim 22 wherein the charging current also comprises continuous charging current during the first charging interval, wherein the control signal includes a second relaxation interval during the first charging interval, after the current pulses and before the continuous charging current.

24. An apparatus according to claim 23 further comprising the battery and at least one battery discharging circuit coupled to the battery including a series arrangement of a resistor and a controlled switch, further comprising the signal means delivering a signal during a discharging interval to the controlled switch to discharge the battery.

* * * * *